United States Patent [19]
Hsu et al.

[11] Patent Number: 5,952,756
[45] Date of Patent: Sep. 14, 1999

[54] PERMANENT MAGNET ENERGY CONVERSION MACHINE WITH MAGNET MOUNTING ARRANGEMENT

[75] Inventors: John S. Hsu, Oak Ridge; Donald J. Adams, Knoxville, both of Tenn.

[73] Assignee: Lockheed Martin Energy Research Corporation, Oak Ridge, Tenn.

[21] Appl. No.: 08/929,512

[22] Filed: Sep. 15, 1997

[51] Int. Cl.⁶ .......................... H02K 16/04; H02K 5/04
[52] U.S. Cl. ...................... 310/156; 310/89; 310/42; 310/268; 310/112; 310/114; 310/184
[58] Field of Search ........................... 310/156, 268, 310/266, 112, 114, 261, 152, 254, 184, 198, 12, 42, 89

[56] References Cited

U.S. PATENT DOCUMENTS

| | | | |
|---|---|---|---|
| 3,467,845 | 9/1969 | Wesolowski | 310/168 |
| 3,699,372 | 10/1972 | Abe et al. | 310/268 |
| 4,187,441 | 2/1980 | Oney | 310/112 |
| 4,488,075 | 12/1984 | DeCesare | 310/156 |
| 4,996,457 | 2/1991 | Hawsey et al. | 310/268 |

*Primary Examiner*—Nestor Ramirez
*Assistant Examiner*—Karl I. Eizo Tamai
*Attorney, Agent, or Firm*—Quarles & Brady LLP

[57] ABSTRACT

A hybrid permanent magnet dc motor includes three sets of permanent magnets supported by the rotor and three sets of corresponding stators fastened to the surrounding frame. One set of magnets operates across a radial gap with a surrounding radial gap stator, and the other two sets of magnets operate off the respective ends of the rotor across respective axial gaps.

7 Claims, 3 Drawing Sheets

PERMANENT MAGNET ENERGY CONVERSION MACHINE WITH MAGNET MOUNTING ARRANGEMENT

FEDERALLY SPONSORED RESEARCH

This invention was made with government support under contract DE-AC05-96OR22464, awarded by the United States Department of Energy to Lockheed Martin Energy Research Corporation, and the United States Government has certain rights in this invention.

BACKGROUND OF THE INVENTION

The field of the invention is permanent magnet motors, and particularly, motors with high power density.

The power rating of a motor is primarily a function of its size. Larger motors provide more air gap area over which the magnetic fields can interact to produce a higher torque. In a conventional radial-gap motor the rotor is generally cylindrical in shape and permanent magnets are mounted around its outer surface to face radially outward to a surrounding annular air gap. The stationary stator winds are disposed around the annular air gap and produce rotating magnetic fields that interact with the fields produced by the rotor magnets to produce a torque which rotates the rotor. Examples of such permanent magnet motors are described in U.S. Pat. Nos. 4,625,135; 4,549,341; 5,280,209; and 4,117,360.

Axial-gap permanent magnet motors have a rotor in which magnets are mounted to one or both ends of the rotor and face in the axial direction. The air gap is formed at one or both ends of the rotor and the stator windings produce rotating fields that are projected axially across the air gap to interact with the magnet fields. Examples of such axial-gap motors are disclosed in U.S. Pat. Nos. 4,996,457; 5,117,141; 5,619,087 and 4,578,610.

None of these prior motors are optimized for maximum power density.

SUMMARY OF THE INVENTION

The present invention is a permanent magnet motor which has a very high rated power for its size. More particularly, the motor has a circular, cylindrical rotor mounted on a shaft rotatably fastened to a motor frame for rotation about an axis, a first set of permanent magnets mounted around the curved, radially outward surface of the rotor, a second set of magnets mounted to one end of the rotor and disposed around the shaft, a third set of magnets mounted to the other end of the rotor and disposed around the shaft, a radial gap stator fastened to the frame and extending around the rotor to form a radial gap, a first axial gap stator fastened to the frame off one end of the rotor and extending around the shaft to form a first axial gap, and a second axial gap stator fastened to the frame off the other end of the rotor and extending around the shaft to form a second axial gap. Currents applied to the three stators produce rotating magnetic fields which interact with the fields produced by the corresponding sets of permanent magnets in the corresponding air gaps to produce a torque that rotates the shaft.

A general object of the invention is to maximize the power density of a permanent magnet motor. By using both a radial gap and two axial gaps, nearly all of the rotor surface is used to produce torque. For a given size rotor, therefore, a substantially maximum torque is produced. As a result, the mechanical power produced by the motor is substantially increased.

Another aspect of the present invention is a method for assembling a hybrid gap motor. To prevent damage to the permanent magnets during assembly, the motor is constructed without the magnets attached to the rotor. Instead, an opening is formed in one axial gap stator and the rotor magnets are inserted through this opening and into axially directed slots in the rotor. The rotor is rotated to align each axial slot with this opening and the first set of magnets are slid into position on the rotor. The second and third sets of magnets are assembled on the rotor at the outset, however, to facilitate assembly, the axial gap stators are placed over them to shunt their magnetic field. After the rotor is in place, the axial gap stators are pulled free of the rotor and secured to the motor end brackets.

Another object of the invention is to facilitate the assembly of large permanent magnet motors. To reduce the forces imposed by the permanent magnets during assembly of the motor, the radially directed magnets are attached after the major motor components are assembled. The forces imposed by the axial magnets are reduced by shunting their flux during the assembly process.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
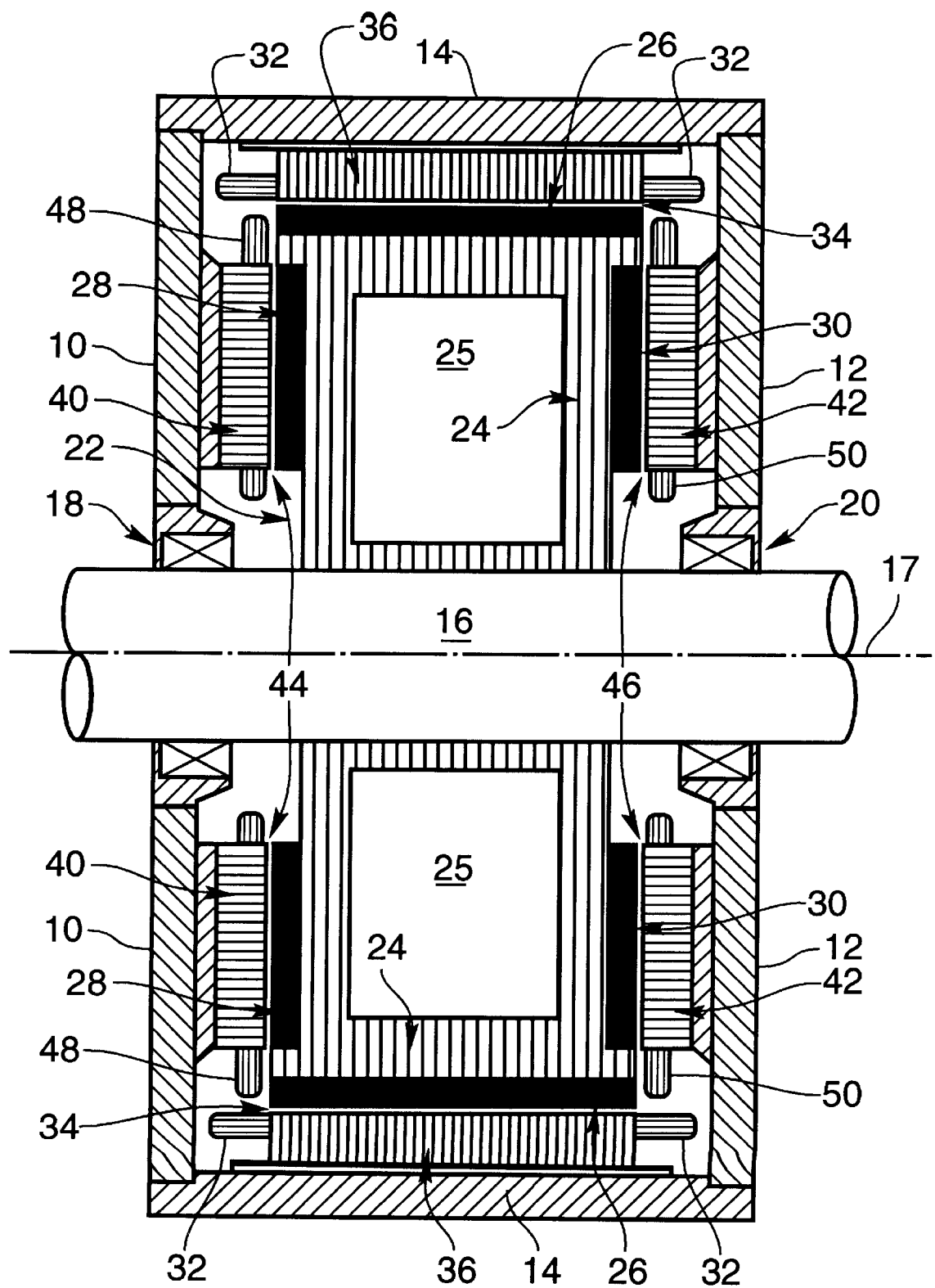
FIG. 1 is an elevation view with parts cut away of the preferred embodiment of the invented motor.

Referring particularly to FIG. 1, the motor includes a circular cylindrical frame comprised of two end brackets 10 and 12 and an outer shell 14. Central openings are formed in each end bracket 10 and 12 and a shaft 16 extends through these openings and is rotatably fastened to the frame by respective ball bearings 18 and 20 for rotation about an axis 17. Ball, roller, sleeve or thrust bearings may be used depending on the size and application of the motor.

The shaft 16 forms part of a rotor structure 22 which is substantially enclosed in the motor frame. The rotor 22 includes a cylindrical core 24 made either of solid steel, or as shown in the preferred embodiment of FIG. 1, stacked steel laminations. In large motors the center of the rotor core 24 may be hollow to form an annular cavity 25 that reduces the weight of the rotor 22. In addition, power electronics that form part of the motor drive system may be mounted in the cavity 25.

Three sets of permanent magnets fasten to the core 24 and produce magnetic flux which flows in the core 24 and surrounding air gaps. These include a first set of magnets 26 which are fastened to the curved outer surface of the core 24. The magnets 26 extend the full axial length of the core 24 and they are spaced equidistantly around the circumference of the core 24. The magnets 26 are fastened using a mounting assembly such as that described in U.S. patent application ESID 1854-X entitled "Method And Apparatus For Assembling Permanent Magnet Rotors". The number and shape of the magnets 26 used will vary depending on the particular application, and they are polarized in the radial direction with alternating orientation of their north and south poles.

Two additional sets of permanent magnets 28 and 30 are fastened to the ends of the rotor core 24. These magnets are disposed in a circular ring about shaft 16 and their number and shape will vary depending on the particular application. The magnets 28 and 30 are polarized in the axial direction and the north/south polarity of the magnets alternates as the ring is traversed. In the preferred embodiment, all of the permanent magnets 26, 28 and 30 are made from Samarium-Cobalt, but other materials commonly used in permanent magnet motors may also be employed.

Mounted to the outer shell 14 and disposed radially outward from the rotor core 24 is a radial gap stator 36. The stator 36 extends completely around the circumference of the rotor core 24 and is constructed from laminated electrical steel. Slots (not shown) are formed in the stator 36 and stator windings 32 are placed in these slots in the well known manner. The stator 36 is spaced radially outward from the pole faces of the permanent magnets 26 to form a radial gap 34. When electrical current flows in the stator windings 32, a rotating magnetic field is produced in this gap 34 which interacts with the magnetic fields produced by the magnets 26. This interaction produces a torque which acts to rotate the rotor 22 and deliver mechanical power to shaft 16.

Two additional stators 40 and 42 are fastened to the respective end brackets 10 and 12 of the motor frame. These axial gap stators 40 and 42 are annular shaped and axially spaced from the respective ends of the rotor core 24 to form respective axial gaps 44 and 46. The axial stators 40 and 42 are constructed from steel lamination tape which is wound to provide laminations that are perpendicular to the axial gaps 44 and 46. The axial stators 40 and 42 support stator windings 48 and 50 wound in slots (not shown) formed in their surfaces. The stator windings 48 and 50 produce rotating magnetic fields that interact across the respective axial gaps 44 and 46 with the magnetic fields produced by permanent magnets 28 and 30. As with the rotating field produced by the radial stator 36, the rotating fields produced by currents flowing in the axial stators 40 and 42 generate a torque in the rotor 22 which rotates the shaft 16 and produces mechanical power.

It should be apparent from the above description that the present invention results in a motor design which maximizes the size of the air gaps in which the torque-producing interaction of the stator and rotor magnetic fields can occur. This results in an increase in the mechanical power the motor can produce for a given motor volume. Typically, the motor rating can be increased one-third or greater over a comparably sized radial gap motor. While the use of two axial gap stators as described above produces the highest power density, it is also possible to employ only a single axial gap stator and associated permanent magnets. This results in a motor with less power density than the preferred embodiment, but greater power density than conventional radial gap motors or axial gap motors.

It should also be apparent to those skilled in the art that the present invention can be used to generate electrical power. Thus, whether power is converted from electrical to mechanical, or mechanical to electrical, the present invention enables the power density of the energy conversion machine to be maximized.

The assembly of large permanent magnet motors is difficult with conventional designs and it is even more difficult with the present invention due to the larger number of permanent magnets used. The forces produced by these permanent magnets are large when they are brought near ferromagnetic materials and they may easily be damaged due to their inherent brittle nature. Accordingly, a number of novel assembly procedures are used to construct the preferred embodiment of the invention.

Figure 2:
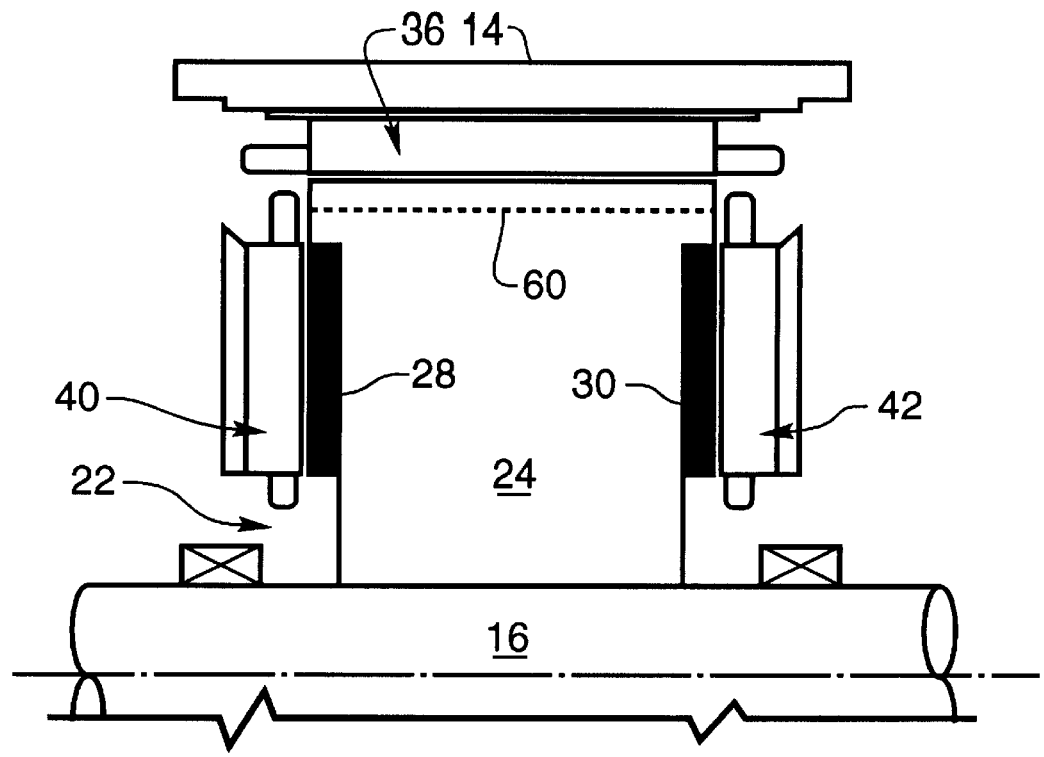
FIG. 2 is a pictorial representation of a first step in the assembly of the motor of FIG. 1.
Figure 3:
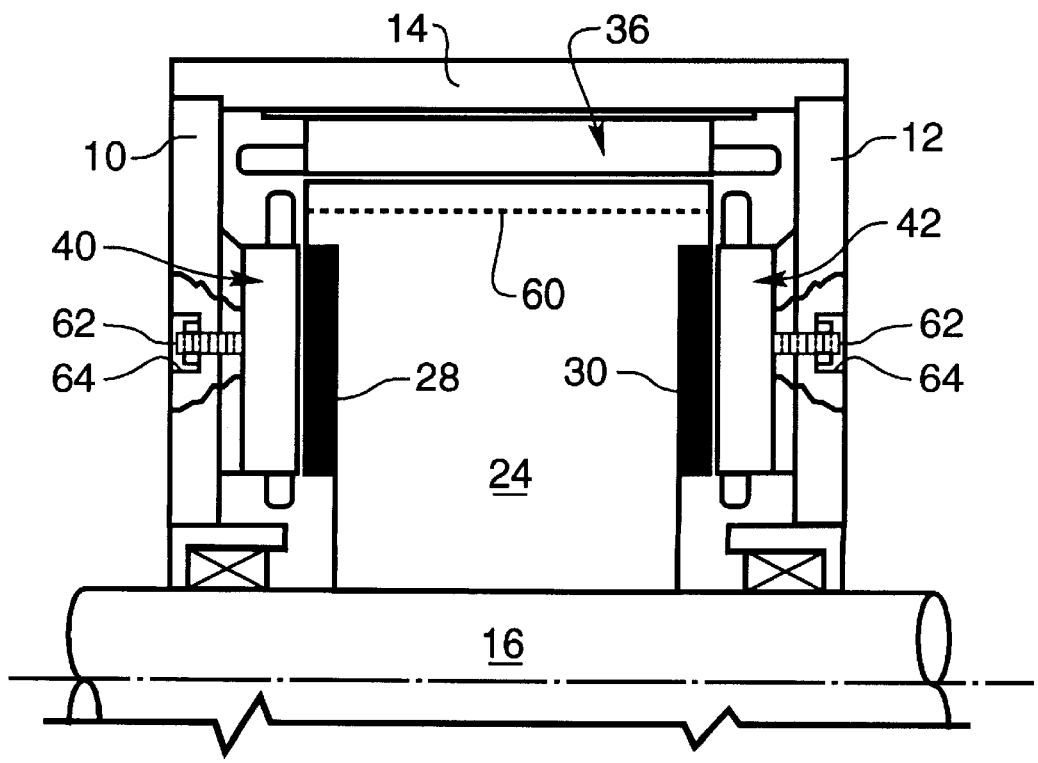
FIG. 3 is a pictorial representation of a second step in the assembly of the motor of FIG. 1.
Figure 4:
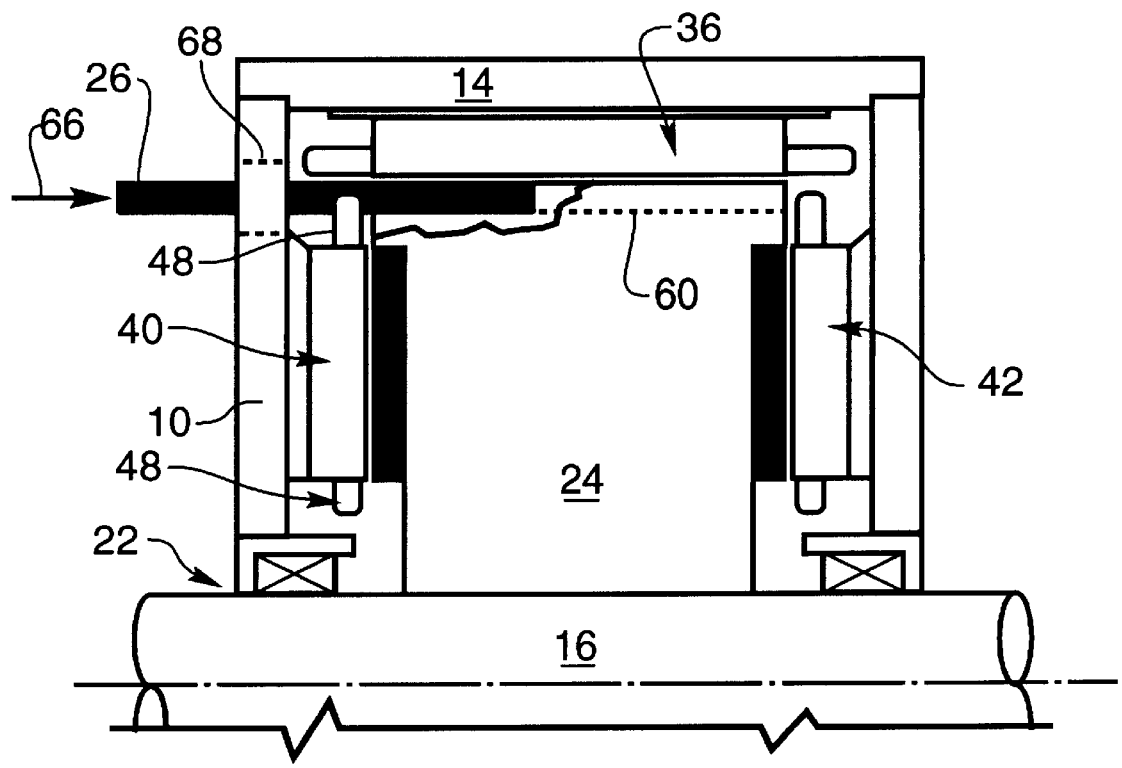
FIG. 4 is a pictorial representation of a third step in the assembly of the motor of FIG. 1.

Referring particularly to FIGS. 2–4, the rotor 22 is completely assembled on the shaft 16, but the magnets 26 are not mounted. The magnets 26 are received in axial slots 60 which are formed around the periphery of the rotor core 24 and these are empty when the rotor 22 is moved into place within the shell 14 as shown in FIG. 2. The axial stators 40 and 42 are placed over the ends of the rotor core 24 and are temporarily held in place by the magnetic force produced by the axial permanent magnets 28 and 30. The stators 40 and 42 act to shunt the magnetic flux produced by the magnets 28 and 30, thus substantially reducing the force they exert on the end brackets 10 and 12 when these elements are assembled as shown in FIG. 3.

After the end brackets 10 and 12 are in place, the axial stators 40 and 42 are pulled away from the rotor magnets 28 and 30. This is accomplished by a set of threaded fasteners 62 which extend through axial openings 64 in the end brackets 10 and 12. The axial openings 64 are equally spaced around the axis 16 so that the fasteners 62 can be tightened to draw the axial stators 40 and 42 away from the grip of the magnets 28 and 30 and firmly fasten them to the respective end brackets 10 and 12.

Figure 5:
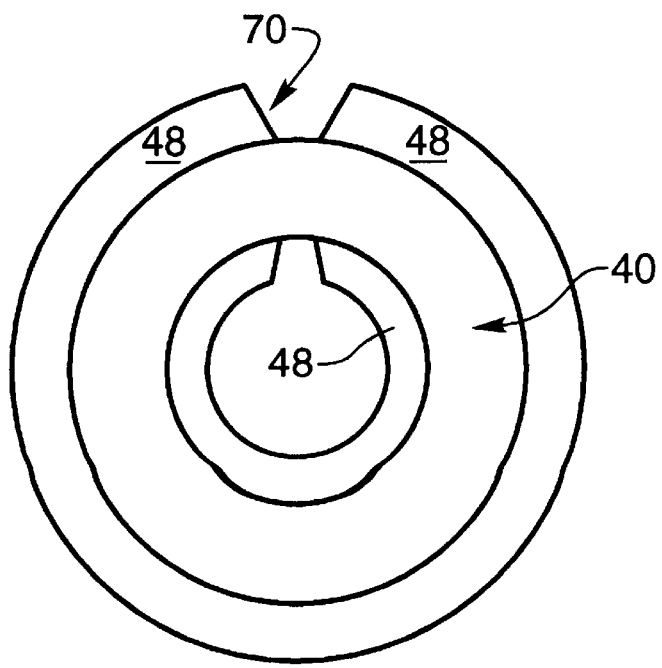
FIG. 5 is plan view of an axial gap stator which forms part of the motor of FIG. 1.

As shown in FIG. 4, the final step is to slide the permanent magnets 26 into the axial slots 60 in the rotor core 24 as indicated by arrow 66. For this purpose an opening 68 is formed in the end bracket 10 through which the permanent magnet 26 may be slid into place on the rotor 22. When two axial gap stators are used as in the preferred embodiment, an axially directed opening 70 is also formed in the axial gap stator 40. As shown best in FIG. 5, this is accomplished by skipping a few coils in each phase of the stator core winding 48. The rotor 22 is revolved to align an empty axial slot 60 with this opening 70 and the end bracket opening 68, and a permanent magnet 26 is slid into position. The rotor 22 is rotated and the process repeated for each permanent magnet 26. If only a single axial gap stator is used, the opening 70 is formed in the end bracket 10 or 12 that does not support an axial gap stator.

What is claimed is:

1. A permanent magnet energy conversion machine, comprising:

a frame;

a cylindrical rotor mounted on a shaft which is rotatably fastened to the frame for rotation about an axis;

a first set of permanent magnets mounted around the periphery of the rotor and producing a radially directed magnetic field;

a second set of permanent magnets mounted to one end of the rotor and disposed around the shaft, the second set of permanent magnets producing an axially directed magnetic field;

a radial gap stator fastened to the frame and extending around the rotor to form a radial gap, the radial gap stator having stator windings;

an axial gap stator fastened to the frame at one end of the rotor and extending around the shaft to form an axial gap, the axial gap stator having stator windings; and, the axial gap stator having an opening for receiving the first set of permanent magnets during assembly of the machine, wherein magnetic fields produced by the first and second sets of permanent magnets interact with magnetic fields produced by currents in the stator windings to convert energy between an electrical and mechanical form.

2. The machine as recited in claim 1, wherein the rotor comprises axially directed peripheral slots for receiving the first set of permanent magnets, the slots being respectively alignable with the opening in the axial gap stator during the assembly.

3. An energy conversion machine, comprising:

a frame;

a cylindrical rotor mounted on a shaft which is rotatably fastened to the frame for rotation about an axis;

a first set of permanent magnets mounted around the periphery of the rotor and producing a radially directed magnetic field;

a second set of permanent magnets mounted to one end of the rotor and disposed around the shaft, the second set of permanent magnets producing an axially directed magnetic field;

a third set of permanent magnets mounted to the other end of the rotor and disposed around the shaft, the third set of permanent magnets producing an axially directed magnetic field;

a radial gap stator fastened to the frame and extending around the rotor to form a radial gap, the radial gap stator having stator windings;

a first axial gap stator fastened to the frame at one end of the rotor and extending around the shaft to form a first axial gap, the first axial gap stator having stator windings; and a second axial gap stator fastened to the frame at the other end of the rotor and extending around the shaft to form a second axial gap, the second axial gap stator having stator windings, magnetic fields produced by the first, second and third sets of permanent magnets interacting with magnetic fields produced by currents in the stator windings to convert energy between an electrical and a mechanical form; and, at least one of the axial gap stators having an opening for receiving the first set of permanent magnets during assembly of the machine.

4. The machine as recited in claim 3, wherein the rotor comprises axially directed peripheral slots for receiving the first set of permanent magnets, the slots being respectively alignable with the opening in the at least one axial gap stator during the assembly.

5. The machine as recited in claim 3, wherein electrical energy is supplied to the stator windings.

6. The machine as recited in claim 3, wherein the magnets in the first, second and third sets of magnets are spaced equidistantly around the rotor with alternating polarities.

7. The machine as recited in claim 3, wherein the frame includes end brackets that enclose each end of the motor and provide rotatable support for the shaft, each end bracket having axially directed openings therein which respectively enable the first and second axial gap stators to be fastened to the end brackets after the frame has been assembled around the rotor.

* * * * *